United States Patent
Bai et al.

(10) Patent No.: US 10,879,902 B2
(45) Date of Patent: Dec. 29, 2020

(54) RECONFIGURABLE CIRCUIT USING NONVOLATILE RESISTIVE SWITCHES

(71) Applicant: NEC CORPORATION, Tokyo (JP)

(72) Inventors: Xu Bai, Tokyo (JP); Toshitsugu Sakamoto, Tokyo (JP); Yukihide Tsuji, Tokyo (JP); Makoto Miyamura, Tokyo (JP); Ayuka Tada, Tokyo (JP); Ryusuke Nebashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/494,419

(22) PCT Filed: Mar. 17, 2017

(86) PCT No.: PCT/JP2017/011012
§ 371 (c)(1),
(2) Date: Sep. 16, 2019

(87) PCT Pub. No.: WO2018/167962
PCT Pub. Date: Sep. 20, 2018

(65) Prior Publication Data
US 2020/0091914 A1 Mar. 19, 2020

(51) Int. Cl.
*H03K 19/1776* (2020.01)
*H03K 19/173* (2006.01)
(Continued)

(52) U.S. Cl.
CPC ......... *H03K 19/1736* (2013.01); *G06F 21/76* (2013.01); *H03K 19/17736* (2013.01)

(58) Field of Classification Search
CPC ................ G06F 21/76; H03K 19/1736; H03K 19/17736
See application file for complete search history.

(56) References Cited

U.S. PATENT DOCUMENTS

| | | | |
|---|---|---|---|
| 7,425,720 B2* | 9/2008 | Kaeriyama | H01L 27/24 257/4 |
| 9,036,398 B2* | 5/2015 | Park | G11C 13/004 365/148 |

(Continued)

FOREIGN PATENT DOCUMENTS

| JP | 8-130448 A | 5/1996 |
|---|---|---|
| JP | 2012-50080 A | 3/2012 |

(Continued)

OTHER PUBLICATIONS

Munehiro Tada, et al., "Improved Off-State Reliability of Nonvolatile Resistive Switch with Low Programming Voltage", IEEE Transactions on Electron Devices, Sep. 2012, pp. 2357-2362, vol. 59, No. 9.

(Continued)

*Primary Examiner* — Kurtis R Bahr
(74) *Attorney, Agent, or Firm* — Sughrue Mion, PLLC (57) ABSTRACT

A reconfigurable circuit includes: a plurality of first lines; one or more second lines; a non-volatile resistive cell coupling one of the first lines with one of the second lines at each cross-point between the first lines and the second lines; and first switch elements including first terminals respectively coupled to the first lines, wherein each of the first switch elements is separately turned on or off in accordance with a control signal applied thereto.

17 Claims, 8 Drawing Sheets

(51) Int. Cl.
G06F 21/76 (2013.01)
H03K 19/17736 (2020.01)

(56) References Cited

U.S. PATENT DOCUMENTS

| | | | |
|---|---|---|---|
| 9,514,810 B1* | 12/2016 | Sadd | G11C 11/1675 |
| 9,659,646 B1* | 5/2017 | Asnaashari | G11C 13/0069 |
| 2012/0026779 A1* | 2/2012 | Ikegami | H03K 19/1776 365/148 |
| 2013/0181180 A1* | 7/2013 | Tada | H01L 45/146 257/1 |
| 2013/0181739 A1* | 7/2013 | Sakimura | G11C 13/0069 326/38 |
| 2015/0249096 A1* | 9/2015 | Lupino | G11C 5/02 257/203 |
| 2017/0331480 A1* | 11/2017 | Bai | H03K 19/17748 |
| 2017/0345491 A1* | 11/2017 | Roy | G06F 11/1068 |

FOREIGN PATENT DOCUMENTS

| | | |
|---|---|---|
| JP | 2013-077681 A | 4/2013 |
| JP | 2014-30110 A | 2/2014 |
| JP | 2015-53533 A | 3/2015 |
| JP | 2015-142175 A | 8/2015 |
| JP | 2015-211326 A | 11/2015 |
| JP | 2016-129318 A | 7/2016 |
| JP | 2016-225797 A | 12/2016 |
| WO | 2010/106876 A1 | 9/2010 |
| WO | 2015/041188 A1 | 3/2015 |
| WO | 2015/198573 A1 | 12/2015 |
| WO | 2016/139926 A1 | 9/2016 |

OTHER PUBLICATIONS

Makoto Miyamura, et al., "Low-power programmable-logic cell arrays using nonvolatile complementary atom switch", ISQED, 2014, pp. 330-334.
Xu Bai et al., "Architecture of Reconfigurable-Logic Cell Array with Atom Switch: Cluster Size & Routing Fabrics", FPGA, 2015, pp. 269.
Written Opinion for PCT/JP2017/011012, dated Jun. 6, 2017.
International Search Report for PCT/JP2017/011012, dated Jun. 6, 2017.
Communication dated Jun. 16, 2020, from the Japanese Patent Office in Application No. 2019-549501.

* cited by examiner

RECONFIGURABLE CIRCUIT USING NONVOLATILE RESISTIVE SWITCHES

CROSS REFERENCE TO RELATED APPLICATIONS

This application is a National Stage of International Application No. PCT/JP2017/011012 filed Mar. 17, 2017.

TECHNICAL FIELD

The present invention relates to a reconfigurable circuit with non-volatile resistive switches.

BACKGROUND ART

A typical semiconductor integrated circuit (IC) is constructed by transistors build on a semiconductor substrate and upper layer wires used to connect the transistors. The patterns of the transistors and the wires are determined in a design stage of the IC. Interconnections between the transistors and the wires cannot be changed after the fabrication of IC. In order to improve flexibility of IC, field-programmable gate arrays (FPGAs) have been proposed and developed. In FPGAs, configuration data including operation and interconnection information is stored in memories, so that different logic operations and interconnections can be realized by configuring the memories after fabrication according to requirements of end users. Interconnections within an FPGA can be altered by controlling ON-and-OFF states of switches in a routing multiplexer (MUX) or routing fabrics arranged in the FPGA in accordance with the interconnection information stored in the memories.

The relatively large energy consumption of FPGAs limits integration of commercial FPGAs into IoT (Internet of Things) devices. In most of commercial FPGAs, a static random access memory (SRAM) is used to store the configuration data. Typically, each memory cell of SRAM is composed of six transistors and each modern FPGA chip has more than 10M (ten-million) memory cells of the SRAM. This causes extremely large area overhead, cost, and energy consumption in FPGAs. In this Description, FPGAs which use SRAMs as memories storing configuration data are referred to as SRAM-based FPGAs or SRAM FPGAs.

Recently, FPGAs with non-volatile resistive switches (NVRSs) such as Nanobridge® (NB) integrated between the wires upon a transistor layer have been proposed to overcome the problems of SRAM-based FPGAs and achieve small area overhead [NPL 1, NPL 2]. FPGAs with NBs are referred to as NBFPGAs (Nanobridge® field programmable gate arrays). Non-volatility of NBs also contributes to zero standby power consumption. An example of NVRS which can applied to a memory portion of LSI (Large-Scale Integration) is disclosed in [PTL 1]. An application of NVRSs in constituting a look-up table (LUT) is disclosed in [PTL 2]. An example of the structure of NVRS and the method of writing data in the NVRS is disclosed in [PTL 3]. An application of NBFPGA as routing fabrics is disclosed in [NPL 3].

CITATION LIST

Patent Literature

[PTL 1]
WO 2015/198573 A1
[PTL 2]
JP 2016-129318A
[PTL 3]
JP 2013-77681A

Non Patent Literature

[NPL 1]
Munehiro Tada, et al., Improved OFF-State Reliability of Nonvolatile Resistive Switch with Low Programming Voltage, IEEE TRANSACTIONS ON ELECTRON DEVICES, Vol. 59, No. 9, pp. 2357-2362, SEPTEMBER 2012.
[NPL 2]
Makoto Miyamura, et al., Low-power programmable-logic cell arrays using nonvolatile complementary atom switch, ISQED 2014, pp. 330-334.
[NPL 3]
Xu Bai et al., Architecture of Reconfigurable-Logic Cell Array with Atom Switch: Cluster Size & Routing Fabrics, FPGA 2015, pp. 269.

SUMMARY OF INVENTION

Technical Problem

In NBFPGA, relatively large leakage current caused by the NB crossbar switch circuit limits its wide applications to battery-powered devices.

An exemplary object of the present invention is to provide a reconfigurable circuit with reduced leakage current of the crossbar switch circuit.

Solution to Problem

According to an exemplary aspect of the present invention, a reconfigurable circuit includes: first lines; one or more second lines; a non-volatile resistive cell coupling one of the first lines with one of the second lines at each cross-point between the first lines and the second lines; and first switch elements including first ends respectively coupled to the first lines, wherein each of the first switch elements is separately turned on or off in accordance with a control signal applied thereto.

DESCRIPTION OF EMBODIMENT

Exemplary embodiments of the present invention will be next described with reference to the accompanying drawings.

First Exemplary Embodiment

Figure 1:
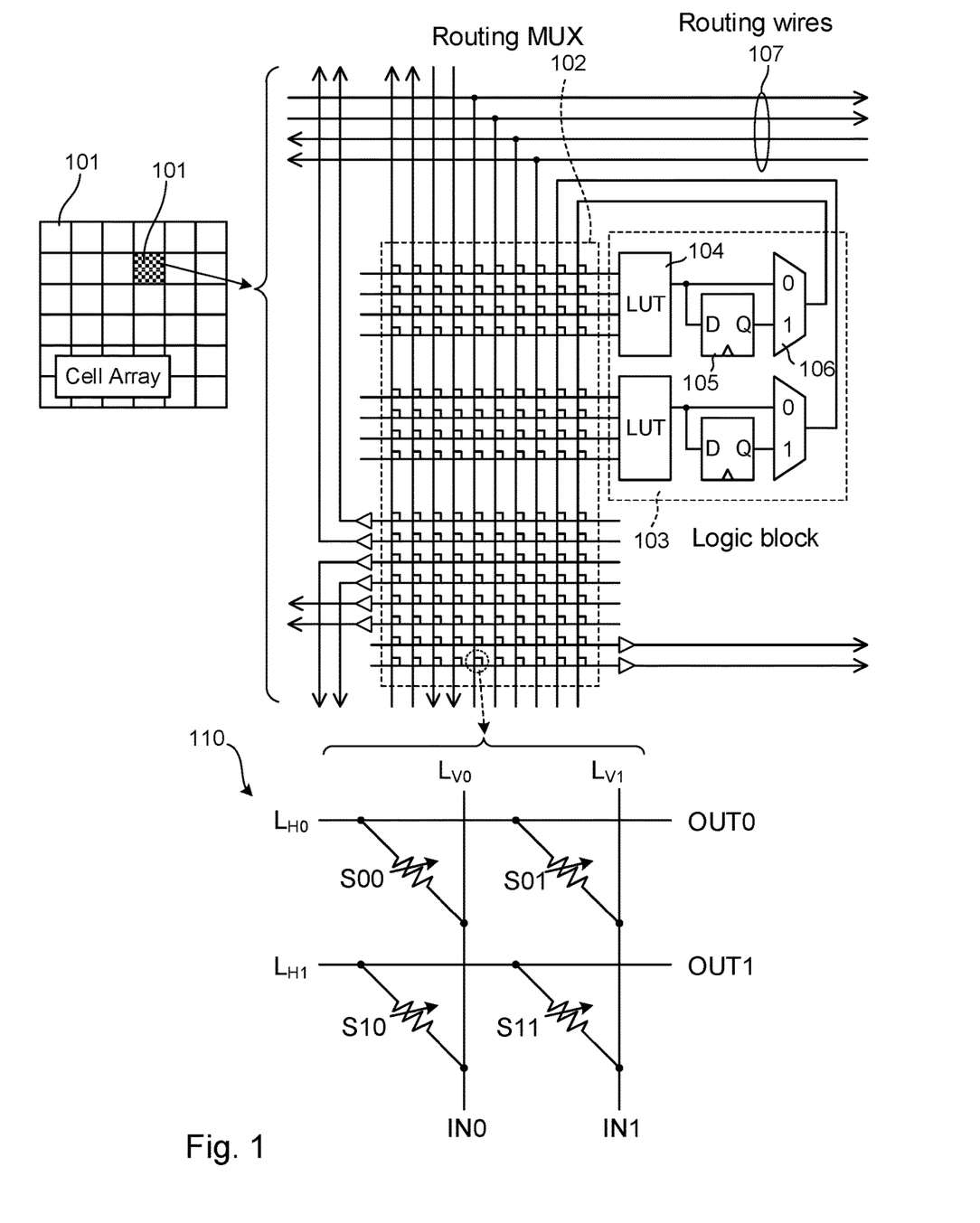
FIG. 1 is a schematic view illustrating an exemplary structure of an NBFPGA.

FIG. 1 illustrates an exemplary configuration of an NBFPGA to which the reconfigurable circuit according to the present invention can be applied. A large number of cells 101 constitute a cell array of the NBFPGA. Each cell 101 includes routing MUX 102 and logic block 103. In this example, logic block 103 includes two LUTs 104, two D-type flip-flops 105 and two selectors 106. Routing MUX 102 includes a plurality of vertical lines and a plurality of horizontal lines arranged in a lattice manner which are connected to logic block 103 and adjacent cells 101. The vertical lines and the horizontal lines may be column lines and row lines, respectively. The vertical and horizontal lines constitute routing wires 107. Data routing switches each comprising an NVRS (non-volatile resistive switch) or an NB are arranged at the respective cross-points or intersections between the vertical lines and the horizontal lines. Therefore, routing MUX 102 has a crossbar structure or crossbar switch circuit including a plurality of crossbar switches. In FIG. 1, enlarged view 110 illustrates four NVRSs S00, S01, S10, S11 arranged at the respective cross-points between vertical lines $L_{V0}$, $L_{V1}$ and horizontal lines $L_{H0}$, $L_{H1}$ and function as crossbar switches. Each of NVRSs S00, S01, S10, S11 is a non-volatile resistive cell including a single NVRS. Ends of vertical lines $L_{V0}$, $L_{V1}$ are used as input ends IN0, IN1, and ends of horizontal lines $L_{H0}$, $L_{H1}$ are used as output ends OUT0, OUT1. If NVRS S00 at the cross-point between vertical line $L_{V0}$ and horizontal line $L_{H0}$ is in its ON-state or set state, vertical line $L_{V0}$ is electrically connected to horizontal line $L_{H0}$. Thus input end IN0 is electrically connected to output end OUT0. On the other hand, if NVRS S00 is in its OFF-state or reset state, vertical line $L_{V0}$ is not electrically connected to horizontal line $L_{H0}$. No signal can transmit from input end IN0 to output end OUT0.

Figure 2:
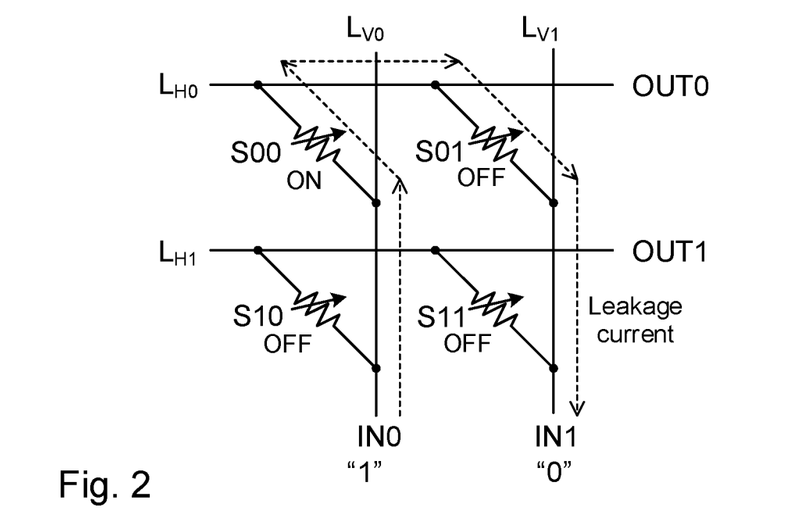
FIG. 2 is a view illustrating leakage current in an NB crossbar switch circuit.

FIG. 2 illustrates a crossbar switch circuit which is the same as the circuit shown in enlarged view 110 in FIG. 1 and explains the leakage current in an NB crossbar switch. If NVRS S00 is in the ON-state or set state, vertical line $L_{V0}$ is electrically connected to horizontal line $L_{H0}$. Then, a signal can be transmitted from input end IN0 to output end OUT0. When a logical value of "1" is applied to input end IN0 and a logic value of "0" is applied to input end IN1, leakage current flows between input end IN0 and input end IN1 due to NVRS S01 which is in the OFF-state or reset state. The path of the leakage current is shown by a dashed line in FIG. 2. Such leakage current causes increase in the consumption power of the circuit and may shorten operable time of a battery-powered device in which an NB crossbar switch circuit is incorporated. The leakage current of the entire circuit increases as the number of the cross-points increase, i.e., the number of the vertical lines and horizontal lines increases. Therefore, measures for reducing the leakage current of NB crossbar switch circuits are needed.

Figure 3:
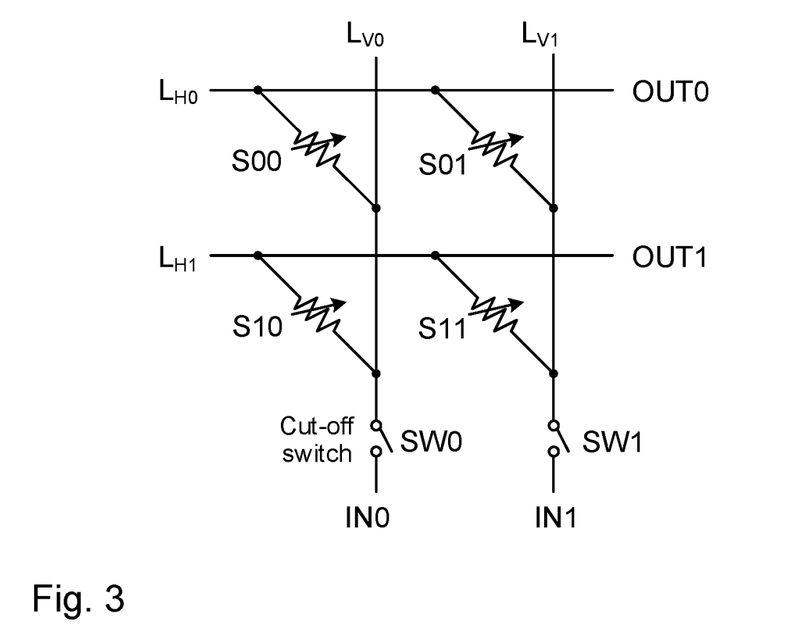
FIG. 3 is a circuit diagram illustrating a reconfigurable circuit according to a first exemplary embodiment.

FIG. 3 illustrates a reconfigurable circuit according to a first exemplary embodiment of the present invention. The circuit shown in FIG. 3 is an example of a 2×2 NB crossbar switch circuit and has a structure in which switch elements SW0, SW1 are added to the circuit shown in FIG. 2. Of course, the number of the vertical lines may be more than 2 and the number of the horizontal lines may be more than 2. Switch elements SW0, SW1 are arranged at the ends of vertical lines $L_{V0}$, $L_{V1}$, respectively, and used as cut-off switches for the leakage current. First terminals of switch elements SW0, SW1 are coupled to vertical lines $L_{V0}$, $L_{V1}$, respectively, and the second terminals of the switch elements are utilized as input ends IN0, IN1, respectively. Each of switch elements SW0, SW1 is configured to be separately turned on or off in accordance with a control signal applied to the switch element.

Figures 4, 5A, 5B:
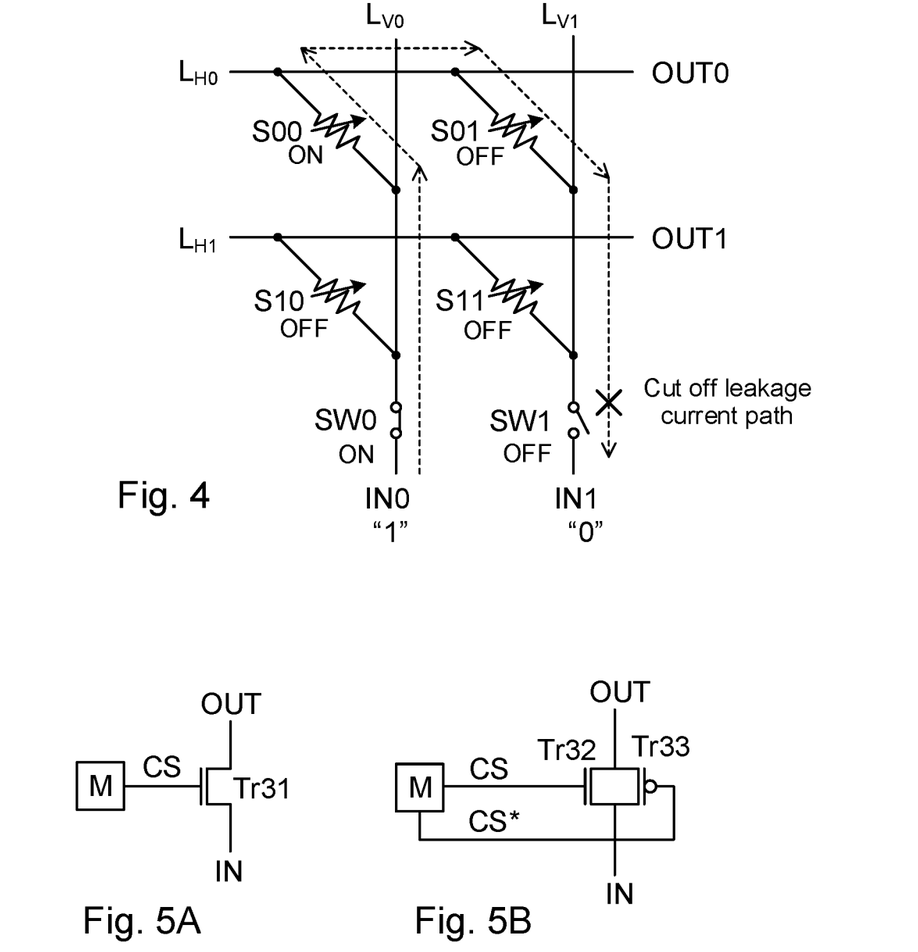
FIG. 4 is a view illustrating leakage current reduction in the circuit shown in FIG. 3.
FIGS. 5A and 5B are circuit diagrams illustrating two kinds of cut-off switches which can be used in the reconfigurable circuit.

FIG. 4 illustrates how to reduce leakage current in the reconfigurable circuit shown in FIG. 3. If it is necessary to transfer data from input end IN0 to output end OUT0, switch element SW0 is turned on and NVRS S00 is made ON-state, while another switch element SW1 is turned off in order to prevent a signal at input end IN1 from being transferred to any output ends. The data transfer path is active for transmitting data from input end IN0 to output end OUT0, and the leakage current path from input end IN0 to input end IN1 is cut off by switch element SW1 for leakage current reduction.

Each of switch elements SW0, SW1 may be implemented by a conventional MOS (metal-oxide-semiconductor) transistor or a nonvolatile resistive memory/switch such as a resistance random access memory (ReRAM), phase change random access memory (PRAM) and Nanobridge® (NB).

FIGS. 5A and 5B illustrate kinds of cut-off switches which can be used as switch elements SW0, SW1 and are implemented by a memory and one or more MOS transistors. The cut-off switch shown in FIG. 5A uses memory M and nMOS transistor Tr31. Memory M outputs control signal CS having a logical level of HIGH or LOW in accordance with the stored value of memory M, the control signal is applied to the gate of transistor Tr31. Here, the control signal is used as an input enable signal for each of vertical lines $L_{V0}$, $L_{V1}$. The drain and source of transistor Tr31 function as output end OUT and input end IN of the switch, respectively. If the data stored in memory M is "1," control signal CS becomes HIGH and transistor Tr31 is made ON-state. On the other hand, if the data stored in memory M is "0," control signal CS becomes LOW and transistor Tr31 is made OFF-state. Advantage of the circuit shown in FIG. 5A is small area due to utilization of one nMOS transistor. Disadvantage of this circuit is that that two kinds of power supply voltages are required for correct signal transmission. The reason of the disadvantage is that if an input signal is HIGH and its voltage level is V1, it is necessary to use V1+$V_{th}$ for control signal CS to make the voltage level at output end OUT of the switch the same as the voltage level at input end IN. Here, $V_{th}$ is the threshold voltage of transistor Tr31.

The cut-off switch shown in FIG. 5B uses memory M and a transmission gate. The transmission gate composed of nMOS transistor Tr32 and pMOS transistor Tr33 can transmit signals without voltage level drop, therefore only one kind of power supply voltage is required. In this case, memory M outputs complementary signals CS, CS* of the control signal which are applied to the gates of transistors Tr32, Tr33, respectively. If the data stored in memory M is "1," control signal CS becomes HIGH and its inverse signal CS* becomes LOW, both transistors Tr32, Tr33 are turned ON. On the other hand, if the data stored in memory M is "0," control signal CS becomes LOW and its inverse signal CS* becomes HIGH, both transistors Tr32, Tr33 are turned OFF. Memory M shown in FIGS. 5A and 5B may be a static random access memory (SRAM) or a non-volatile memory.

Figure 6:
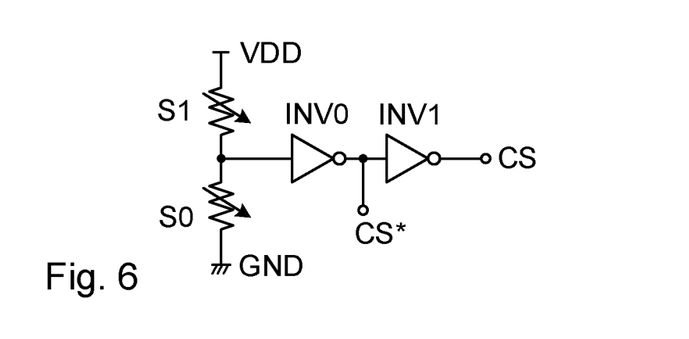
FIG. 6 is a circuit diagram illustrating a memory using two NVRSs which can be used in the reconfigurable circuit.

FIG. 6 illustrates a non-volatile memory which can be used as memory M in the circuit shown in each of FIGS. 5A and 5B. The non-volatile memory comprises two NVRSs S0, S1 and two inverters INV0, INV1. NVRSs S0, S1 are connected serially between voltage source line VDD and ground line GND. The input terminal of inverter INV0 which functions as a buffer is coupled to the midpoint between NVRSs S0, S1, and the output terminal of inverter INV0 is coupled to the input terminal of inverter INV1. Control signal CS appears at the output terminal of inverter INV1 while inverse signal CS* appears at the output terminal of inverter INV0. When NVRS S0 is made ON-state and another NVRS S1 is made OFF-state, a logic value of "0" is stored in memory M. Control signal CS becomes LOW. On the other hand, if NVRS S0 is made OFF-state and NVRS S1 is made ON-state, a logic value of "1" is stored in memory M, and then memory M outputs control signal CS of HIGH. When only inverse signal CS* is necessary for operating switch elements SW0, SW1, second invertor INV1 can be omitted.

Figure 7:
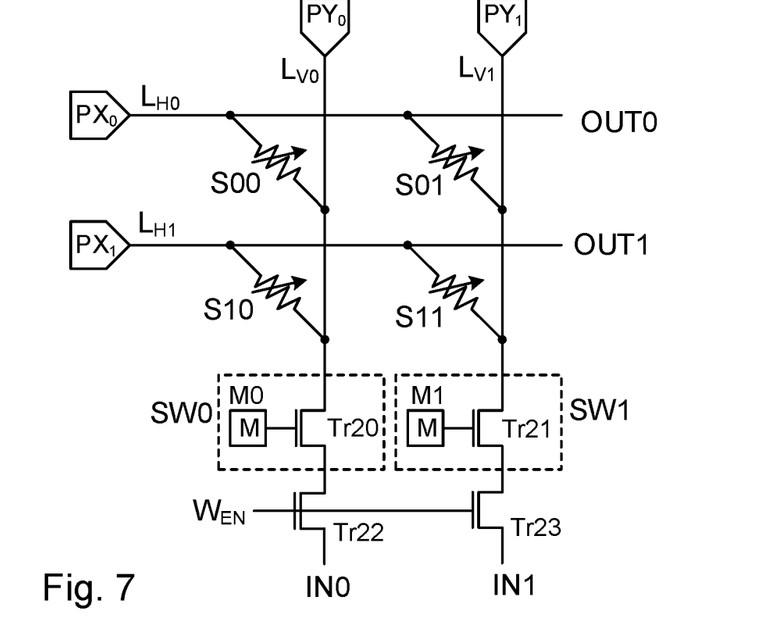
FIG. 7 is a circuit diagram illustrating the reconfigurable circuit equipped with a write circuit.

FIG. 7 illustrates a reconfigurable circuit equipped with write circuit. The circuit shown in FIG. 7 has a structure in which two write drivers $PY_0$, $PY_1$ coupled to vertical lines $L_{V0}$, $L_{V1}$, respectively, two write drivers $PX_0$, $PX_1$ coupled to horizontal lines $L_{H0}$, $L_{H1}$, respectively, and two transistors Tr22, Tr23 are added to the circuit shown in FIG. 3. Here, we use the cut-off switch of the first kind shown in FIG. 5A for each of switch elements SW0, SW1, as an example. Therefore, switch element SW0 includes memory M0 and nMOS transistor Tr20, and switch element SW1 includes memory M1 and nMOS transistor Tr21. Four write drivers $PY_0$, $PY_1$, $PX_0$, $PX_1$ in total are used for writing data to four NVRSs or NBs S00, S01, S10, S11. Transistors Tr22, Tr23 are arranged between the second terminals of switch elements SW0, SW1 and input ends IN0, IN1, respectively. Alternatively, transistors Tr22, Tr23 may be interposed between the first terminals of switch elements SW0, SW1 and vertical lines $L_{V0}$, $L_{V1}$. Common write enable signal $W_{EN}$ is commonly applied to gates of transistors Tr22, Tr23. In order to avoid write disturbance problems, transistors Tr22, Tr23 are controlled by common write enable signal $W_{EN}$ to isolate the target crossbar switch circuit from the other crossbar switch circuits. When writing the NVRSs of the NB crossbar switch circuit, write enable signal $W_{EN}$ is set to a logical level of LOW to cut off the interconnections between the target crossbar switch circuit and the other crossbar switch circuits.

Figure 8:
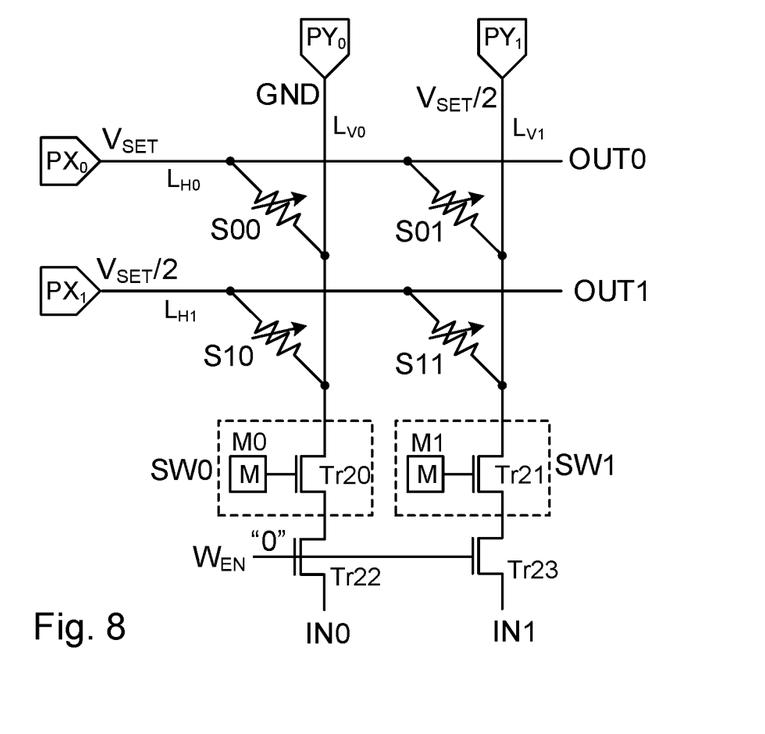
FIG. 8 is a view explaining the writing method of the reconfigurable circuit.

FIG. 8 illustrates how to write data to the NVRS or crossbar switch in the circuit shown in FIG. 7. It is assumed that the set and reset voltages of the NVRS are represented by $V_{SET}$ and $V_{RESET}$, respectively. In case of writing data of "1" in NVRS S00, drivers $PY_0$, $PX_0$ are selected. The output of driver $PY_0$ is set to the ground line potential GND and the output of driver $PX_0$ is set to set voltage $V_{SET}$. The outputs of other drivers $PX_1$, $PY_1$ are set to $V_{SET}/2$ to avoid miswrite of the other NVRSs or NBs. Write enable signal $W_{EN}$ is set to "0" for isolation. Similarly, when data of "0" is written in NVRS S00, the output of driver $PY_0$ is set to reset voltage $V_{RESET}$ and the output of driver $PX_0$ is set to GND. The outputs of other drivers $PX_1$, $PY_1$ are set to $V_{RESET}/2$, and write enable signal $W_{EN}$ is set to "0."

In the NBFPGA shown in FIG. 1, the cells 101 are connected with each other by routing wires 107. Each cell 101 may receive data from routing wires 107 in four directions: left, right, up and down. Each routing wire 107 may connect one cell 101 with the other M pieces of cells 101 in one direction. Also, there may be N pieces of routing wires 107 in the same direction. As a result, each cell 101 may have 4×M×N pieces of input ends, each of M and N being an integer not less than 1. So that, in a typical NBFPGA, the number of the horizontal lines in the crossbar switch circuit is not smaller than 4. However, in some cases, the number of the horizontal lines may be two or more.

Second Exemplary Embodiment

Next, a second exemplary embodiment will be described. The present embodiment discloses a high-reliability reconfigurable circuit using 1-transistor-2-NVRS resistive cells (1T2R-NVRCs). The 1T2R-NVRC has OFF-state reliability better than that of a single NVRS which is used in the first exemplary embodiment as a crossbar switch. An example of structure of the 1T2R-NVRC is disclosed in [PTL 1, PTL 3].

Figure 9:
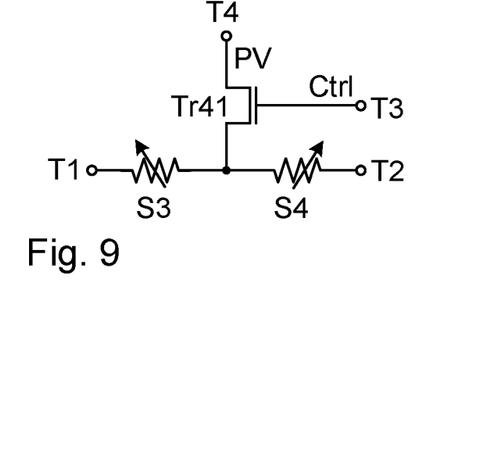
FIG. 9 is a circuit diagram illustrating an example of a non-volatile resistive cell (NVRC) with a 1-transistor 2-NVRSs (1T2R) structure.

FIG. 9 illustrates the constitution of a typical 1T2R NVRC with four terminals T1 to T4. An NVRS has structurally-defined orientation or polarity in general. In the 1T2R NVRC, two NVRSs S3, S4 are connected in series in the opposite orientation with each other. The serial connection of NVRSs S3, S4 is arranged between terminals T1, T2. Both NVRSs S3, S4 are made ON-state for enabling data routing between terminals T1, T2, while both NVRSs S3, S4 are made OFF-state for disabling data routing between terminals T1, T2. The two serially-connected NVRSs can contribute to low programming voltage and high OFF-state reliability, because voltage stress is divided into half for each NVRS [NPL 1, NPL 2]. One end of write control transistor Tr41 is coupled to a common terminal or a common electrode of NVRSs S3, S4 while the other end of transistor Tr41 is coupled to terminal T4 to which program voltage PV for write operation is applied. Transistor Tr41 is controlled by write control signal Ctrl via terminal T3 to apply the program voltage to the common terminal of NVRSs S3, S4.

Figure 10:
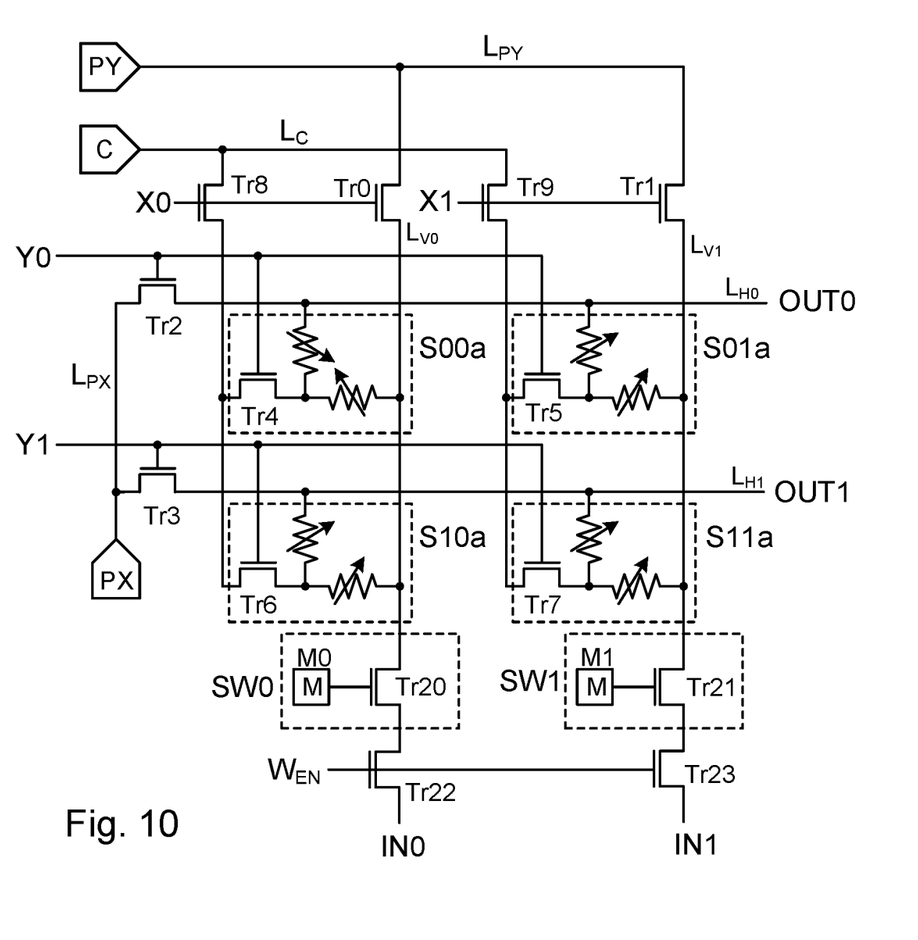
FIG. 10 is a circuit diagram illustrating a reconfigurable circuit according to a second exemplary embodiment which uses 1T2R-NVRCs and is equipped with a program circuit.

FIG. 10 illustrates the reconfigurable circuit according to the present exemplary embodiment. The circuit shown in FIG. 10 has a structure in which NVRSs S00, S01, S10, S11 in the circuit shown in FIG. 7 are replaced with crossbar switches S00a, S01a, S10a, S11a each consisting of an 1T2R NVRC shown in FIG. 9, respectively. Terminals T1, T2 (see, FIG. 9) of the crossbar switches can connect the vertical line with the horizontal line at the cross-point between the vertical and horizontal lines. Crossbar switches S00a, S01a, S10a, S11a are non-volatile resistive cells. In FIG. 10, reference signs Tr4, Try, Tr6, Tr7 are assigned to the write control transistors in crossbar switches S00a, S01a, S10a, S11a, respectively. In addition, write drivers PY0, PY1, PX0, PX1 in the circuits shown in FIG. 7 are replaced with common column write driver PY, common row write driver PX, common mid program driver C and transistors Tr0 to Tr3, Tr8 and Tr9 in the circuit shown in FIG. 10.

Diodes or the like may be used instead of the write control transistors. Write drivers PX, PY, C are used to write four crossbar switches S00a, S01a, S10a, S11a.

More specifically, vertical lines $L_{V0}$, $L_{V1}$ are coupled to an output of a common column write driver PY via respective nMOS transistors Tr0, Tr1, and horizontal lines $L_{H0}$, $L_{H1}$ are coupled to an output of common row write driver PX via respective nMOS transistors Tr2, Tr3. The line connecting the output of column program driver PY to transistors Tr0, Tr1 is column program line $L_{PY}$, and the line connecting the output of row program driver PX to transistors Tr2, Tr3 is row program line $L_{PX}$. Terminals T4, to which the ends of write control transistors are connected, of the crossbar switches on the same column or the same vertical line are connected with each other, and then coupled to common mid program driver C via one of nMOS transistors Tr8, Tr9 which are provided for the respective vertical lines. The line connecting the output of mid program driver C to transistors Tr8, Tr9 is mid program line $L_C$. Row address signals X0, X1 and column address signals Y0, Y1 control transistors Tr0 to Tr9 to select one of crossbar switches S00a, S01a, S10a, S11a of which the connection state is to be configured.

Also in the circuit shown in FIG. 10, switch elements SW0, SW1 and transistors Tr22, Tr23 are arranged at vertical lines $L_{V0}$, $L_{V1}$. The Switch elements function as cut-off switches for cutting off input signals and reduce the leakage current flowing between the vertical lines. Transistors Tr22, Tr23 controlled by common write enable signal $W_{EN}$ isolate the crossbar switch circuit from the other crossbar switch circuits to avoid write disturb problems. When writing one of crossbar switches S00a, S01a, S10a, S11a, write enable signal $W_{EN}$ is set to LOW to cut off interconnections between the target crossbar switch circuit and the other crossbar switch circuits.

Figure 11:
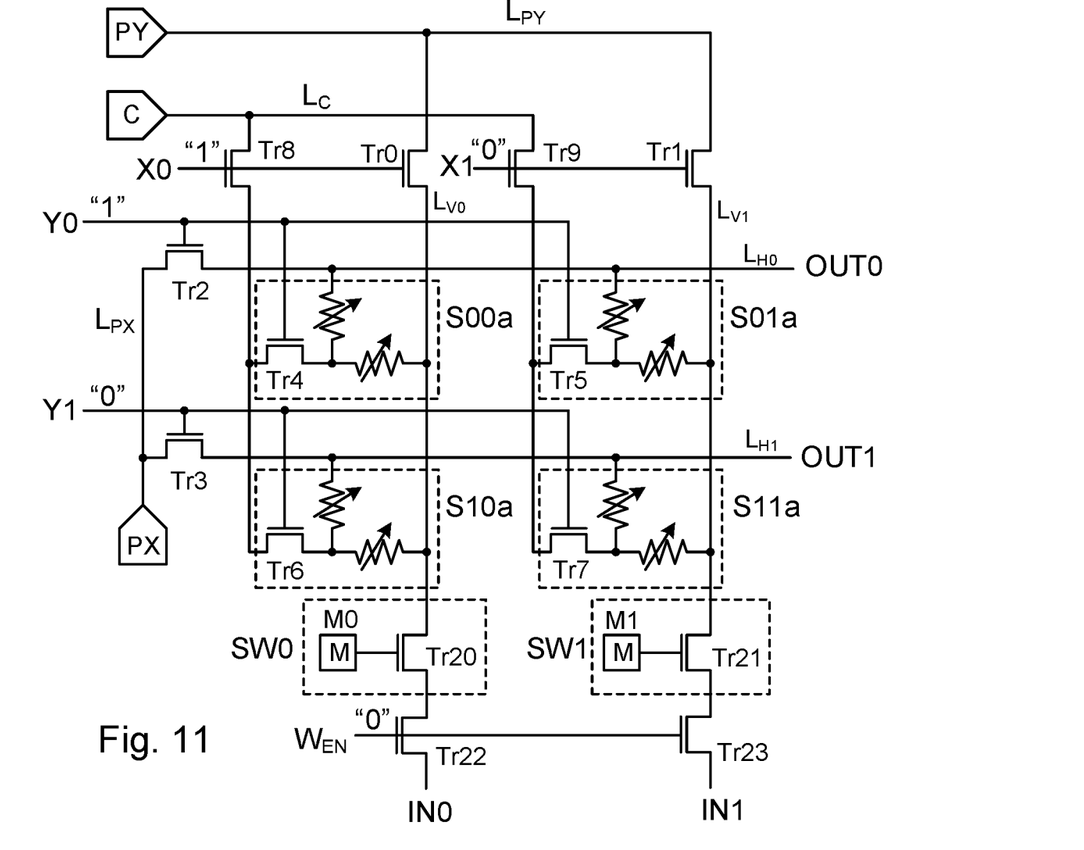
FIG. 11 is a view explaining the writing method of the reconfigurable circuit shown in FIG. 10.

FIG. 11 illustrates how to write the crossbar switches using 1T2R-NVRCs in the circuit shown in FIG. 10. When a crossbar switch is set or turned on, data "1" is written to each of the serially-connected NVRSs of the crossbar switch. Similarly, when a crossbar switch is reset or turned off, data "0" is written to each of the serially-connected NVRSs. In case to set or turn on crossbar switch S00a, both row address X0 and column address Y0 are set to "1," while both row address X1 and column address Y1 are set to "0" to select crossbar switch S00a. The output of write driver PX is set to set voltage $V_{SET}$, the output of write driver C is set to the ground line potential GND and the output of write driver PY is set to a high impedance (hi-Z) state. Subsequently, the output of write driver PX is set to the hi-Z state, the output of write driver C is set to GND and the output of write driver PY is set to $V_{SET}$. As a result, $V_{SET}$ is in turn applied to both NVRSs in crossbar switch S00a. Write enable signal is maintained to "0" for isolation.

In case to reset or turn off crossbar switch S00a, both row address X0 and column address Y0 are maintained to "1," both row address X1 and column address Y1 are maintained to "0," and write enable signal is maintained to "0." The output of write driver PX is set to GND, the output of write driver C is set to reset voltage $V_{RESET}$ and the output of write driver PY is set to the hi-Z state. Subsequently, the output of write driver PX is set to the hi-Z state, the output of write driver C is set to $V_{RESET}$, and the output of write driver PY is set to GND.

Third Exemplary Embodiment

Figure 12A:
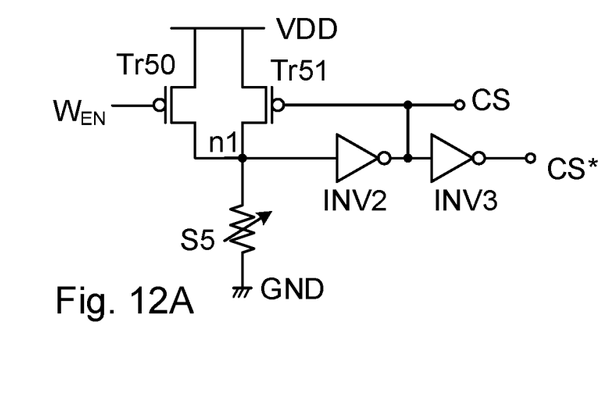
FIG. 12A is a circuit diagram illustrating a memory using one NVRS.

Next, a third exemplary embodiment will be described. In this exemplary embodiment, an improved memory for controlling each of the switch elements is used for high-speed operation of the reconfigurable circuit. The memory used in the present exemplary embodiment is used for controlling the switch element shown in FIG. 5A or FIG. 5B, instead of the memory shown in FIG. 6. FIG. 12A illustrates the improved memory using one NVRS, and FIG. 12B indicates a circuit symbol of the improved memory.

As shown in FIG. 12A, the memory includes: one NVRS S5, which may be replaced by one 1T2R-NVRC; two pMOS transistors Tr50, Tr51; and two inverters INV2, INV3. Sources of transistors Tr50, Tr51 are connected to voltage source line VDD and drains of transistors Tr50, Tr51 are connected to node n1. NVRS S5 is connected to node n1 and the ground potential line GND. An input terminal of invertor INV2 is connected to node n1. An output terminal invertor INV2 provides control signal CS, and is connected to a gate of transistor Tr51 and an input of invertor INV3. An output terminal of invertor INV3 provides inverse signal CS* of control signal CS. When inverse signal CS* is not necessary for operating switch elements SW0, SW1, invertor INV3 can be omitted. Write enable signal $W_{EN}$ of the reconfigurable circuit is applied to a gate of transistor Tr50. Transistor Tr50 functions as a precharge transistor to increase voltage of node n1 to VDD for read operation. Transistor Tr51 is a keeper transistor working with inverter INV2 to form a feedback structure for maintaining the stored value of the memory. In this memory, if write enable signal $W_{EN}$ is LOW and NVRS S5 is made OFF-state, control signal CS from invertor INV2 becomes LOW. Therefore, isolation between the vertical lines of the crossbar switch circuits in write operation can also be realized by the memory using one NVRS.

Figure 13:
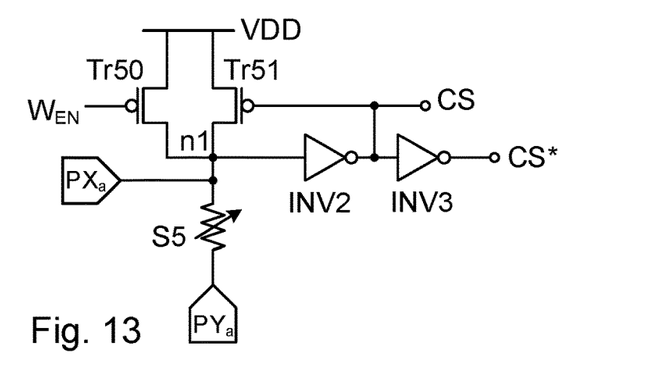
FIG. 13 is a circuit diagram illustrating the memory equipped with a write circuit.

The memory shown in FIG. 12A may be equipped with a write circuit. FIG. 13 illustrates such a memory with the write circuit. In the memory shown in FIG. 13, two write drivers $PX_a$, $PY_a$ are added for write operation. Write driver $PX_a$ is connected to node n1 to which one end of NVRS S5 is connected, and write driver $PY_a$ is connected to the other end of NVRS S5. In the write operation, in order to set NVRS S5, write enable signal $W_{EN}$ is set to HIGH, the output of write driver $PY_a$ is set to $V_{SET}$, and the output of write driver $PX_a$ is set to GND. In order to reset NVRS S5, write enable signal $W_{EN}$ is set to HIGH, the output of write driver $PY_a$ is set to GND, and the output of write driver $PX_a$ is set to $V_{RESET}$. In the read operation, write driver $PX_a$ is set to a hi-Z state, and write driver $PY_a$ is set to GND.

Figure 12B:
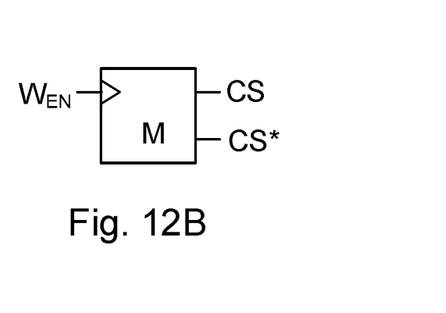
FIG. 12B is a view illustrating a circuit symbol of the memory shown in FIG. 12A.
Figure 14:
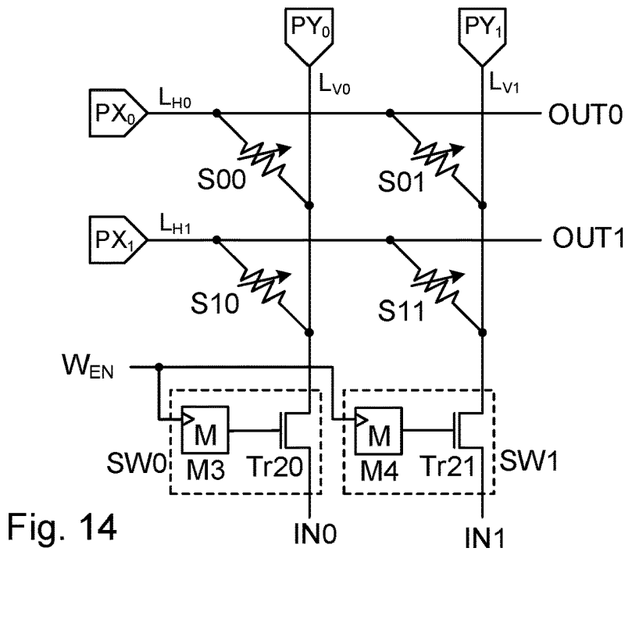
FIG. 14 is a circuit diagram illustrating the reconfigurable circuit equipped with a write circuit.

FIG. 14 illustrates a reconfigurable circuit according to the third exemplary embodiment which uses the memory shown in FIGS. 12 and 13. Similar to the circuit shown in FIG. 7, the reconfigurable circuit shown in FIG. 14 has switch elements SW0, SW1 each consisting of one nMOS transistor Tr20 or Tr21. However, the circuit shown in FIG. 14 is different from the circuit shown in FIG. 7 in that the outputs of memory circuits M3, M4 having the structure shown in FIGS. 12 and 13 are connected to the gates of transistors Tr20, Tr21. Since write enable signal $W_{EN}$ is applied to memory M3, M4, transistors Tr22, Tr23 which are connected between transistors Tr20, Tr21 and input ends IN0, IN1 are omitted. The memories M3, M4 each having one NVRS can implement both storing an input cut-off signal and performing isolation control. Comparing the circuit shown in FIG. 7, the number of nMOS transistors arranged in data transfer paths from input ends IN0, IN1 to output ends OUT0, OUT1 are reduced, the circuit shown in FIG. 14 can operate at high speed.

Figure 15A:
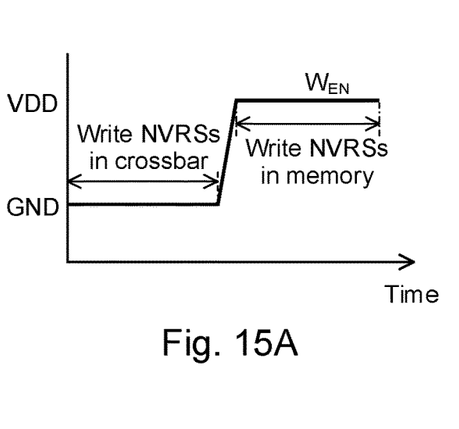
FIGS. 15A and 15B are timing charts with regard to common write enable signal $W_{EN}$.
Figure 15B:
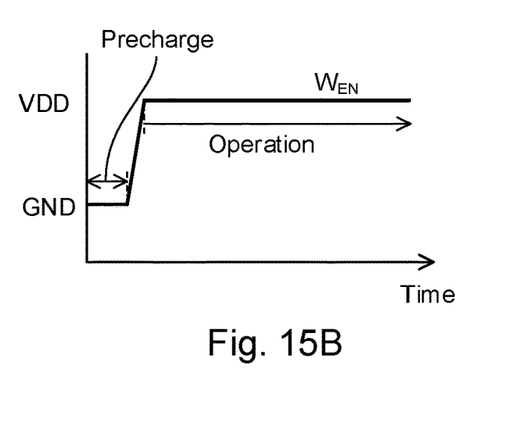

FIGS. 15A and 15B are timing charts of write enable signal $W_{EN}$ in write mode and application mode of the reconfigurable circuit, i.e., the NBFPGA, of the present exemplary embodiment. In the write operation, it is required to write the NVRSs in the crossbar switch circuits and logic blocks at first and then write the NVRSs in the memories for cutting off input signals. The NVRSs in NBFPGA are initially in OFF-state, if write enable signal $W_{EN}$ is set to LOW at first as shown in FIG. 15A, all the crossbar switches are isolated from each other. The write operation of NVRSs in the crossbar switches can be correctly done without write disturb problems. After that, write enable signal $W_{EN}$ is changed into HIGH to write the NVRSs in the memories for cutting off the input signals. As shown in FIG. 15B, in the application mode, write enable signal $W_{EN}$ is at first set to LOW to precharge the memory which uses one NVRS. After that, write enable signal $W_{EN}$ is set to HIGH for ON/OFF control of the input signals.

Figure 16:
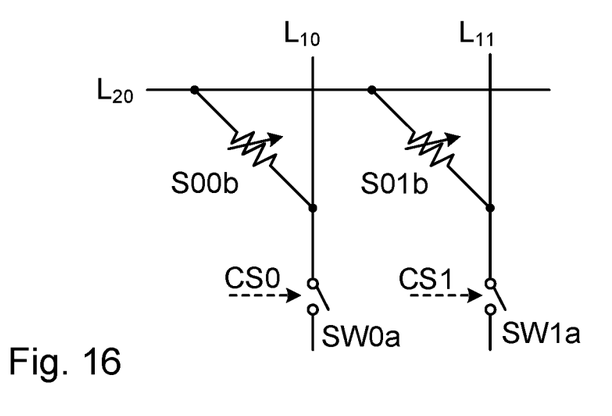
FIG. 16 is a circuit diagram illustrating a reconfigurable circuit according to another exemplary embodiment.

FIG. 16 illustrates a reconfigurable circuit according to another exemplary embodiment which corresponds to the minimum configuration according to the present invention. The reconfigurable circuit shown in FIG. 16 includes: a plurality of first lines $L_{10}$, $L_{11}$; second line $L_{20}$; non-volatile resistive cells S00b, S01b coupling first lines $L_{10}$, $L_{11}$ with second lines $L_{20}$ at cross-points between first lines $L_{10}$, $L_{11}$ and second line $L_{20}$; and switch elements SW0a, SW1a including first ends respectively coupled to first lines $L_{10}$, $L_{11}$. Switch elements SW0a, SW1a are separately turned on or off in accordance with control signals CS0, CS1 applied to switch elements SW0a, SW1a, respectively. The circuit shown in FIG. 16 prevent leakage current from flowing between first lines $L_{10}$, $L_{11}$.

The reconfigurable circuits of the above exemplary embodiments may be used in, for example, mobile phone, IoT (Internet of Things) devices, and so on. A low-power NBFPGA can be realized by the reconfigurable circuits described above.

It is apparent that the present invention is not limited to the above exemplary embodiments and examples, but may be modified and changed without departing from the scope and sprit of the invention.

The whole or part of the exemplary embodiments disclosed above can be described as, but not limited to, the following supplementary notes.

(Supplementary Note 1)
A reconfigurable circuit comprising:
a plurality of first lines;
one or more second lines;
a non-volatile resistive cell coupling one of the first lines with one of the second lines at each cross-point between the first lines and the second lines; and
first switch elements including first ends respectively coupled to the first lines,
wherein each of the first switch elements is separately turned on or off in accordance with an enable signal applied thereto.

(Supplementary Note 2)
The reconfigurable circuit according to supplementary note 1, wherein the enable signal is generated by a memory.

(Supplementary Note 3)
The reconfigurable circuit according to supplementary note 2, wherein the memory is provided for each of the first switch elements.

(Supplementary Note 4)
The reconfigurable circuit according to supplementary note 2 or 3, further comprising a write circuit writing data to the memory.

(Supplementary Note 5)
The reconfigurable circuit according to any one of supplementary notes 2 to 4, further comprising:
second switch elements, first ends of the second switch elements being connected with second ends of the first switch elements, respectively,
wherein second ends of the second switch elements are utilized as input ends of the reconfigurable circuit.

(Supplementary Note 6)
The reconfigurable circuit according to any one of supplementary notes 2 to 4, further comprising:
second switch elements interposed between the first ends of the first switch elements and the first lines, respectively,
wherein second ends of the first switch elements are utilized as input ends of the reconfigurable circuit.

(Supplementary Note 7)
The reconfigurable circuit according to supplementary note 5 or 6, wherein the second switch elements are turned on or off in accordance with a common write enable signal.

(Supplementary Note 8)
The reconfigurable circuit according to any one of supplementary notes 2 to 7, wherein the memory comprises:
a buffer;
a first non-volatile resistive switch including a first end coupled to a power source line and a second end coupled to a node, the node being coupled to an input terminal of the buffer; and
a second non-volatile resistive switch including a first end coupled to a ground line and a second end coupled to the node.

(Supplementary Note 9)
The reconfigurable circuit according to any one of supplementary notes 2 to 4, wherein second ends of the first switch elements are utilized as input ends of the reconfigurable circuit.

(Supplementary Note 10)
The reconfigurable circuit according to supplementary note 9, wherein the memory comprises:
an inverter;
a non-volatile resistive switch including a first end coupled to a ground line;
a first transistor including a source coupled to a power source line and a gate to which a write enable signal is applied; and
a second transistor including a source coupled to the power source line, a gate coupled to an output terminal of the inverter, and a drain coupled to a node,
wherein a drain of the first transistor and an input terminal of the first invertor are coupled to the node.

(Supplementary Note 11)
The reconfigurable circuit according to any one of supplementary notes 1 to 10, wherein the non-volatile resistive cell comprises a non-volatile resistive switch.

(Supplementary Note 12)
The reconfigurable circuit according to supplementary note 11, wherein each of the first lines and the second lines is coupled to a write driver.

(Supplementary Note 13)
The reconfigurable circuit according to any one of supplementary notes 1 to 10, wherein
the non-volatile resistive cell comprises a first non-volatile resistive switch and a second non-volatile resistive switch whose first end is coupled to a first end of the first non-volatile resistive switch,
a second end of the first non-volatile resistive switch is coupled to the one of the first lines, and a second end of the second non-volatile resistive switch is coupled to the one of the second lines.

(Supplementary Note 14)

The reconfigurable circuit according to supplementary note 13, further comprising:

first selection transistors respectively connected to the first lines and controlled by first address, second selection transistors respectively connected to the second lines and controlled by second address, third lines respectively provided for the first lines;

a control transistor provided for each cross-point, a drain of the control transistor being connected to a coupling part of the first end of the first non-volatile resistive switch and the first end of the second non-volatile resistive switch, a source of the control transistor being connected to one of the third lines corresponding to the each cross-point, an address signal of the second address corresponding to the each cross-point being applied to a gate terminal of the control transistor;

a fourth line;

third selection transistors respectively connecting the third lines to the fourth line;

a first program driver applying a first program voltage to first lines through first selection transistors, respectively;

a second program driver applying a second program voltage to second lines through the second selection transistors, respectively; and a third program driver applying a third program voltage to the fourth line.

(Supplementary Note 15)

The reconfigurable circuit according to any one of supplementary notes 1 to 14, wherein each of the switch elements comprises a MOS transistor.

(Supplementary Note 16)

The reconfigurable circuit according to any one of supplementary notes 1 to 14, wherein each of the switch elements comprises a transmission gate.

(Supplementary Note 17)

The reconfigurable circuit according to any one of supplementary notes 1 to 16, wherein the number of the first lines is not smaller than 4.

(Supplementary Note 18)

The reconfigurable circuit according to any one of supplementary notes 1 to 17, wherein the number of the second lines is not smaller than 2.

(Supplementary Note 19)

A reconfigurable circuit comprising:

a plurality of first lines;

one or more second lines;

a non-volatile resistive cell coupling one of the first lines with one of the second lines at each cross-point between the first lines and the second lines; and a plurality of first switch means connecting the plurality of first lines and a plurality of input ends, respectively, said plurality of first switch means being separately controlled.

(Supplementary Note 20)

The reconfigurable circuit according to claim 19, further comprising:

a plurality of second switch means connecting the plurality of first switch means and the plurality of input ends, respectively, said plurality of second switch means being commonly controlled.

REFERENCE SIGNS LIST

| | |
|---|---|
| IO1, IO2 | Input ends; |
| $L_{H0}$, $L_{H1}$ | Horizontal lines; |
| $L_{V0}$, $L_{V1}$ | Vertical lines; |
| OUT1, OUT2 | Output ends; |
| S00, S01, S10, S11 | Non-volatile resistive switches (NVRSs); and |
| SW1, SW2 | Switch elements. |

The invention claimed is:

1. A reconfigurable circuit comprising:
a plurality of first lines;
one or more second lines;
a non-volatile resistive cell coupling one of the first lines with one of the second lines at each cross-point between the first lines and the second lines; and
first switch elements including first ends respectively coupled to the first lines, wherein each of the first switch elements is separately turned on or off in accordance with a control signal applied thereto,
wherein the control signal is generated by a memory, and
wherein the memory comprises:
a buffer;
a first non-volatile resistive switch including a first end coupled to a power source line and a second end coupled to a node, the node being coupled to an input terminal of the buffer; and
a second non-volatile resistive switch including a first end coupled to a ground line and a second end coupled to the node.

2. The reconfigurable circuit according to claim 1, wherein the memory is provided for each of the first switch elements.

3. The reconfigurable circuit according to claim 1, further comprising a write circuit writing data to the memory.

4. The reconfigurable circuit according to claim 1, further comprising:
second switch elements, first ends of the second switch elements being connected with second ends of the first switch elements, respectively,
wherein second ends of the second switch elements are utilized as input ends of the reconfigurable circuit.

5. The reconfigurable circuit according to claim 4, wherein the second switch elements are turned on or off in accordance with a common write enable signal.

6. The reconfigurable circuit according claim 1, further comprising:
second switch elements interposed between the first ends of the first switch elements and the first lines, respectively,
wherein second ends of the first switch elements are utilized as input ends of the reconfigurable circuit.

7. The reconfigurable circuit according to claim 6, wherein the second switch elements are turned on or off in accordance with a common write enable signal.

8. The reconfigurable circuit according to claim 1, wherein the non-volatile resistive cell comprises a non-volatile resistive switch.

9. The reconfigurable circuit according to claim 8, wherein each of the first lines and the second lines is coupled to a write driver.

10. The reconfigurable circuit according to claim 1, wherein each of the switch elements comprises a MOS transistor.

11. The reconfigurable circuit according to claim 1, wherein each of the switch elements comprises a transmission gate.

12. The reconfigurable circuit according to claim 1, wherein the number of the first lines is not smaller than 4.

13. The reconfigurable circuit according to claim 1, wherein the number of the second lines is not smaller than 2.

14. A reconfigurable circuit comprising:
a plurality of first lines;
one or more second lines;
a non-volatile resistive cell coupling one of the first lines with one of the second lines at each cross-point between the first lines and the second lines; and
first switch elements including first ends respectively coupled to the first lines,
wherein each of the first switch elements is separately turned on or off in accordance with a control signal applied thereto,
wherein the control signal is generated by a memory,
wherein second ends of the first switch elements are utilized as input ends of the reconfigurable circuit, and
wherein the memory comprises:
  an inverter;
  a non-volatile resistive switch including a first end coupled to a ground line;
  a first transistor including a source coupled to a power source line and a gate to which a write enable signal is applied; and
  a second transistor including a source coupled to the power source line, a gate coupled to an output terminal of the inverter, and a drain coupled to a node, and
wherein a drain of the first transistor and an input terminal of the inverter are coupled to the node.

15. The reconfigurable circuit according to claim 14, wherein the non-volatile resistive cell comprises a non-volatile resistive switch.

16. The reconfigurable circuit according to claim 15, wherein each of the first lines and the second lines is coupled to a write driver.

17. A reconfigurable circuit comprising:
a plurality of first lines;
one or more second lines;
a non-volatile resistive cell coupling one of the first lines with one of the second lines at each cross-point between the first lines and the second lines; and
first switch elements including first ends respectively coupled to the first lines,
wherein each of the first switch elements is separately turned on or off in accordance with a control signal applied thereto,
wherein the non-volatile resistive cell comprises a first non-volatile resistive switch and a second non-volatile resistive switch whose first end is coupled to a first end of the first non-volatile resistive switch,
wherein a second end of the first non-volatile resistive switch is coupled to the one of the first lines,
wherein a second end of the second non-volatile resistive switch is coupled to the one of the second lines, and
wherein the reconfigurable circuit further comprises:
  first selection transistors respectively connected to the first lines and controlled by first address;
  second selection transistors respectively connected to the second lines and controlled by second address;
  third lines respectively provided for the first lines;
  a control transistor provided for each cross-point, a drain of the control transistor being connected to a coupling part of the first end of the first non-volatile resistive switch and the first end of the second non-volatile resistive switch, a source of the control transistor being connected to one of the third lines corresponding to the each cross-point, an address signal of the second address corresponding to the each cross-point being applied to a gate terminal of the control transistor;
  a fourth line;
  third selection transistors respectively connecting the third lines to the fourth line;
  a first program driver applying a first program voltage to the first lines through the first selection transistors, respectively;
  a second program driver applying a second program voltage to the second lines through the second selection transistors, respectively; and
  a third program driver applying a third program voltage to the fourth line.

* * * * *

UNITED STATES PATENT AND TRADEMARK OFFICE
CERTIFICATE OF CORRECTION

PATENT NO. : 10,879,902 B2
APPLICATION NO. : 16/494419
DATED : December 29, 2020
INVENTOR(S) : Xu Bai et al.

Page 1 of 1

It is certified that error appears in the above-identified patent and that said Letters Patent is hereby corrected as shown below:

In the Specification

Column 6, Description of Embodiments, Line 61; Delete "Try," and insert --Tr5,-- therefor In the Claims Column 12, Line 21; In Claim 1, after "lines,", insert --¶--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*